United States Patent [19]
Schindler

[11] 3,948,346
[45] Apr. 6, 1976

[54] MULTI-LAYERED ACOUSTIC LINER
[75] Inventor: Guenter M. Schindler, Palos Verdes, Calif.
[73] Assignee: McDonnell Douglas Corporation, Long Beach, Calif.
[22] Filed: Apr. 2, 1974
[21] Appl. No.: 457,183

[52] U.S. Cl. .............. 181/33 G; 181/33 H; 181/56; 181/33 D; 415/119
[51] Int. Cl.² .......................................... E04B 1/99
[58] Field of Search ........ 181/33 G, 33 H, 33 HA, 181/33 HB, 33 HC, 42; 415/119

[56] References Cited
UNITED STATES PATENTS

| | | | |
|---|---|---|---|
| 3,380,206 | 4/1968 | Barnett | 181/33 G |
| 3,439,774 | 4/1969 | Allawat et al. | 181/33 C |
| 3,481,427 | 12/1969 | Dobbs et al. | 181/33 G |
| 3,542,152 | 11/1970 | Adamson | 181/50 |
| 3,670,843 | 6/1972 | Kelly et al. | 181/33 G |
| 3,734,234 | 5/1973 | Wirt | 181/33 G |
| 3,769,767 | 11/1973 | Scott | 181/33 G |

FOREIGN PATENTS OR APPLICATIONS
822,954    1959    United Kingdom............... 181/33 G Primary Examiner—L. T. Hix
Assistant Examiner—Vit W. Miska
Attorney, Agent, or Firm—John P. Scholl; Walter J. Jason; Donald L. Royer

[57] ABSTRACT

This invention concerns a multi-layered acoustic liner which breaks up high amplitude sound and shock waves into several waves of the same type but smaller amplitudes, converting some acoustic energy into heat and shifting part of the acoustic energy to a higher frequency level to achieve better absorption by the atmosphere. The sandwich-type perforated plate acoustic liner comprises several layers of honeycomb backing material which are separated by thin perforated sheets.

3 Claims, 4 Drawing Figures

MULTI-LAYERED ACOUSTIC LINER

BACKGROUND OF THE PRESENT INVENTION

Ever since the development of the first commercial jet transport, aircraft and engine manufacturers have been investigating ways of reducing noise caused by such aircraft. Since turbofan engines are big contributors of noise, various sound absorbing techniques have been applied to them. In one instance acoustic linings in the bypass duct and compressor casing of a jet engine are used to attenuate noise as disclosed in U.S. Pat. No. 3,640,357 for Acoustic Linings issuing Feb. 8, 1972 and assigned to Rolls Royce Limited. This lining comprises an impervious sheet, a channel layer, a first porous sheet, a honeycomb layer and a second porous sheet. Another by Rolls Royce Limited, U.S. Pat. No. 3,670,843 issuing June 20, 1972 for Sandwich Structures relates to a sound absorptive liner for use in gas turbine engines consisting of a sandwich structure which has two layers of cellular material separated by a porous sheet and an impervious sheet attached to the outer face of one of the layers of cellular material. A Sound Energy Absorbing Apparatus, U.S. Pat. No. 3,439,774 issuing April 22, 1969 and assigned to The Boeing Company relates to a sound absorbing panel comprising two spaced sheets of microporous material, the outer sheet being of high permeability for high frequency noise absorption, and the inner sheet being of a lower permeability for low frequency sound absorption, with cellular structure placed between the two sheets and between the inner sheet and a supporting surface. Still another U.S. Pat. No. 3,481,427 for Acoustical Panel Structure issuing Dec. 2, 1969 and assigned to McDonnell Douglas Corporation, the present assignee, uses the concept of transmission loss for sound energy absorption. Sound waves propagating over a porous surface pass into still air cavities where they are entrapped within the absorptive material below the open face.

All of the foregoing techniques absorb or attenuate sound through the use of multiple layers of material spaced by cellular cavities into which at least some of the sound energy is trapped. While these techniques are effective in attenuating low amplitude sound, a different physical principle underlies the absorption of high amplitude sound and shock waves to which the present invention is directed.

SUMMARY OF THE PRESENT INVENTION

In contrast to the previously discussed methods of sound absorption and suppression, the present invention is especially adapted to handle the high amplitude sound waves which typically emanate from aircraft jet engines. These high amplitude waves tend to distort into N-type or saw-tooth sound waves whose amplitude rises very rapidly to a peak value and tapers off slowly as they propagate. This characterizes the high amplitude sound and shock waves typically emitted from the blade tips of a jet engine rotor, for example. The principle of sound and shock reflection is used whereby the shape and harmonic content of the reflected or outgoing waves are different from those of the incoming waves. With proper spacing between the perforated sheets or reflectors and with a sufficient number of layers it is possible to excite a higher harmonic corresponding to a desired frequency at which part of the acoustic energy is supposed to be radiated into the outside medium. The liner of the present invention thus operates as a sound transformer since it transforms acoustic energy from a lower frequency to a higher frequency. Most sound absorption takes place in the atmosphere where higher frequency sound is much better attenuated than lower frequency sound when passing therethrough. Some absorption also may take place inside the liner where it is mainly due to viscous dissipation and in special cases to resonance effects.

The multi-layered acoustic liner of the present invention is a sandwich-type perforated plate acoustic liner comprising several layers of honeycomb backing material separated by thin perforated sheets. The perforation of the sheets used for separating the cellular layers should be relatively large (about 50 percent or more) to allow the waves to enter and exit. The sheet thickness should be negligibly small compared with the layer thickness (only a few percent). The spacing between the perforated sheets (thickness of the cellular layers) is the same and a fraction of half a wave length of the incoming wave. The incoming wave of a certain wave length is partly reflected from the upper perforated plate and partly enters the layers through the orifices. The part of the wave that enters will partly penetrate into deeper layers or be reflected from plates in the interior. During this process portions of the wave will leave the liner at intervals through the holes in the upper plate. This outgoing wave constitutes a train of smaller waves of equal wave length. As a result, the harmonic content of the outgoing (reflected) wave will be drastically different from that of the incoming wave. In detail, the amplitude of the particular harmonic whose frequency corresponds to the shorter wave length of the outgoing wave will have an increase over the amplitude of the same harmonic of the incoming wave. This means that the outgoing wave radiates more acoustic power at higher frequencies than the incoming wave. By choosing a sufficient number of layers, the frequency of that particular harmonic of the outgoing wave can be beyond the audible range of the human ear. Also, by transferring radiating acoustic power to a higher frequency level a better atmospheric absorption can be achieved. In this manner high amplitude noise that emanates from a source such as machinery or rotary engines, including jet engine rotor blades, is reduced and therefore less offensive to persons.

BRIEF DESCRIPTION OF ILLUSTRATIVE EMBODIMENT

DETAILED DESCRIPTION OF ILLUSTRATIVE EMBODIMENT

Figure 1:
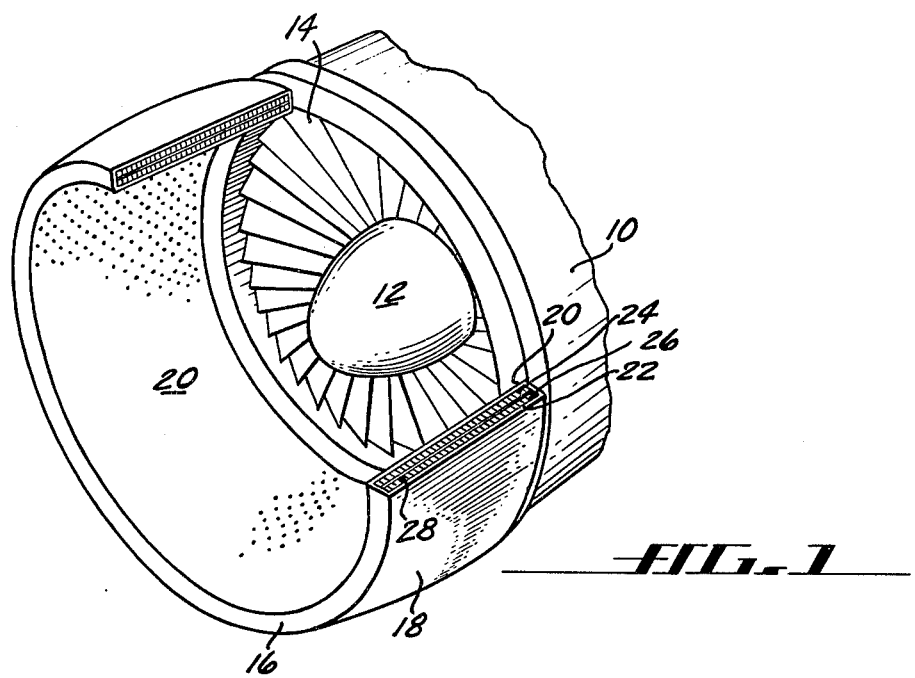
FIG. 1 is a perspective illustration of an acoustic liner in front of the blades of an aircraft jet engine.

In FIG. 1 there is shown a portion of an aircraft engine 10 having a hub 12 and rotor blades 14. This engine typically will be attached to the wings, fuselage, or tail or an aircraft through appropriate mountings, not shown. Forwardly of the plane of rotation of blades 14 is an extension of the housing of engine 10. This forward extension 16 includes an acoustic liner 18. This liner 18 consists of a perforated inner plate 20, an outer cover 22, and a plurality of layers 24, 26 of partitioned structure such as honeycomb in between. Each layer 24, 26 is separated from the other by a perforated sheet 28. While only two layers are shown, any number may be selected, depending upon the noise input frequency and the desired output frequency.

The velocity of blades 14 as they rotate around hub 12 differs in the takeoff, cruise and landing modes of the aircraft. The worst noise problem often occurs during takeoff so the blade velocity at takeoff may determine the frequency of the acoustic field environment to which the acoustic liner 18 is designed. In an illustrative application, 38 blades at a velocity of 3600 revolutions per minute provide a blade passage frequency over any point on the liner of approximately 2280 cycles per second (Hertz). The audible range of the human ear is approximately from about 15 to about 10,000 Hertz. The wave length equals the speed of sound divided by the frequency. This wave length value is used in determining the thickness of the honeycomb layers or the depth of the cellular cavities.

Figure 2:
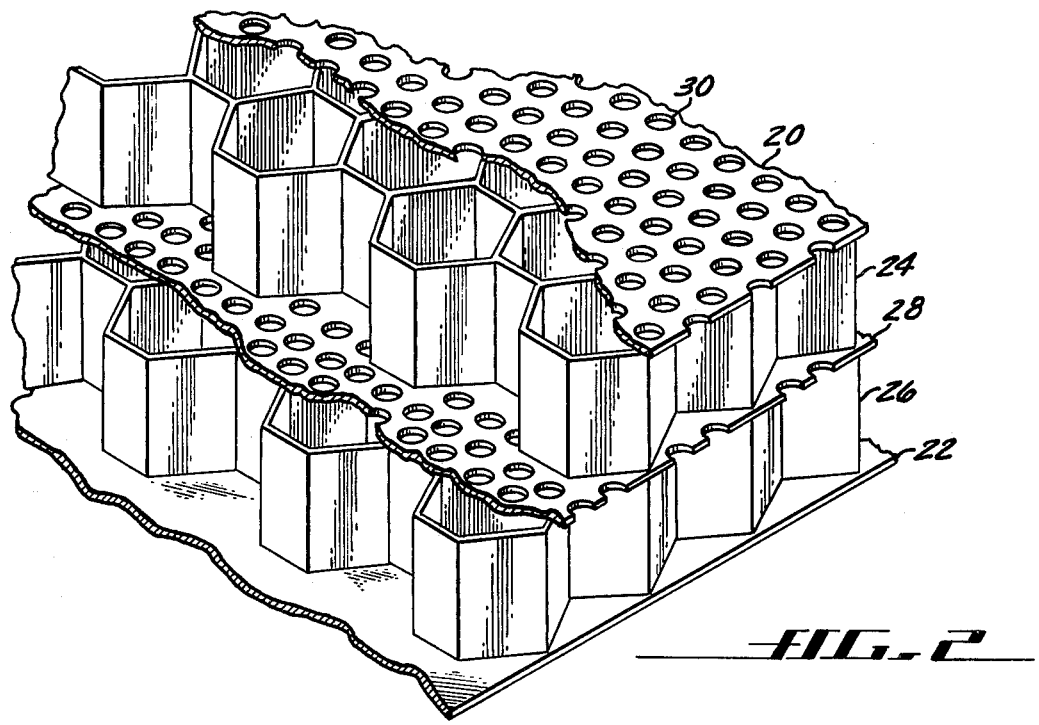
FIG. 2 is an enlarged fragmentary view of a double-layered acoustic liner.

Reference is now made to FIG. 2 wherein there is shown an enlarged fragmentary view of the liner 18. Here there is shown the inner perforated plate 20, outer cover or backing sheet 22, and two layers 24, 26 of cellular material such as honeycomb, with a perforated sheet 28 in between. These may be bonded or welded into an integral acoustic panel. Preferably the perforations 30 are on the order of 50 percent of the surface of the sheets 20 and 28. The thickness of the layers 24, 26 depend upon the wave length of the incoming sound to be transformed to a higher frequency, and the number of layers depends upon the desired frequency of the output. If the thicknesses of the layers are the same the outgoing wave will constitute a train of smaller waves of equal wave length. If X is the number of layers of equal thickness $d$, and $L$ is the wave length of the incoming wave, and $d = L/2$ $(X+1)$, then the wave length of the outgoing partial waves is $L/(X+1)$. When one layer is used the frequency of the output is double that of the input. When two layers are used the frequency of the output frequency is triple that of the input. When $X$ number of layers are used a frequency of $(X+1)$ times the input frequency is enhanced.

Figure 3:
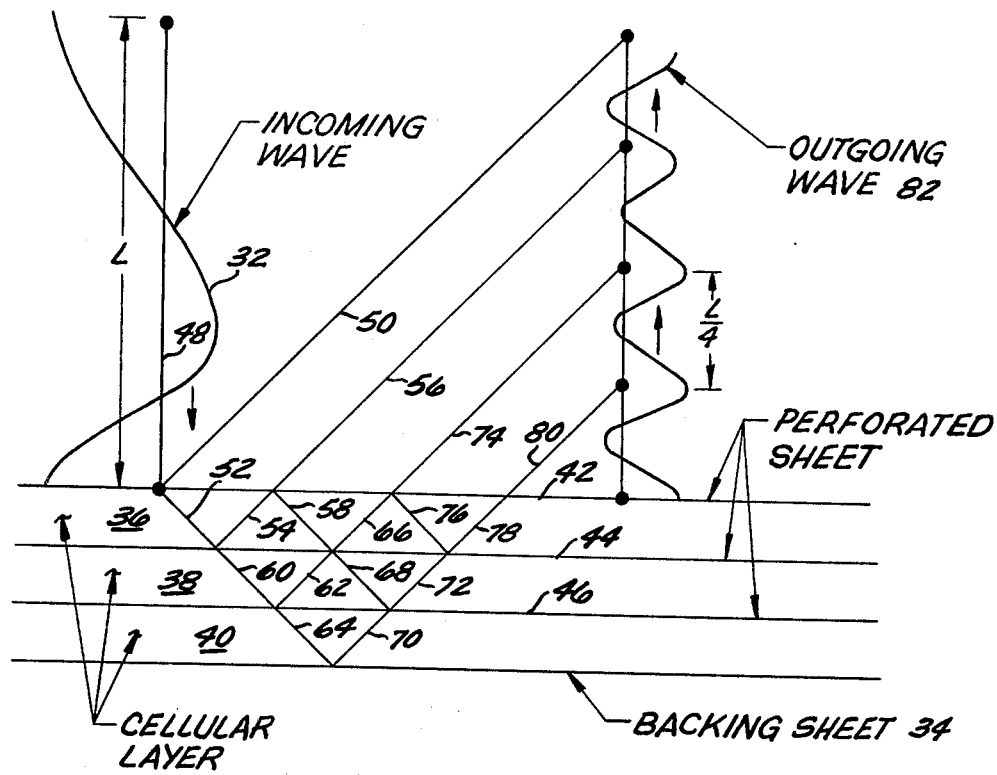
FIG. 3 is a graphic illustration showing the operational principle of a multi-layered acoustic liner.

Reference is now made to FIG. 3 which is a schematic illustration of the reflecting principle underlying the multi-layered acoustic transformer liner of the present invention. Here is shown an incoming wave 32 of wave length L. The acoustic transformer consists of a backing sheet 34, three cellular layers 36, 38 and 40 and three perforated sheets 42, 44 and 46. The wave impinges upon sheet 42 along line 48. Part of the wave reflects off sheet 42 as shown by line 50. The rest enters the cavities of layer 36 as shown by line 52. Part of the wave reflects from sheet 44 as shown by line 54. Part escapes out of sheet 42 as shown by line 56 and some reflects back onto sheet 44 as shown by line 58. The rest of the wave represented by line 52 penetrates sheet 44 and into the cavities of layer 38 as shown by line 60. The wave represented by line 60 reflects from sheet 46 along line 62 and some also penetrates sheet 46 and impinges on backing sheet 34 as shown by line 64. The wave represented by line 62 passes through sheet 44 as shown by line 66 and some is reflected back to layer 46 as shown by line 68. The wave shown by line 64 reflects from backing sheet 34 as shown by line 70. Further reflections from sheet 46 are not shown. The wave shown by line 70 penetrating sheet 46 is shown by line 72. The wave shown by line 68 passes partly into layer 40 and is not shown. The complimentary part is reflected from sheet 46 and is shown by the same line 72. Part of the wave shown by line 66 passes through sheet 42 as shown by line 74 and the complimentary part is reflected back into layer 36 as shown by line 76. The wave shown by line 72 reflects partly back into cavity 38 and is not shown. The other part passes through sheet 44 and is shown by line 78. Part of the wave shown by line 76 passes through sheet 44 and is not shown. The other part of the wave shown by line 76 is reflected from sheet 44 and is also shown by line 78. The wave shown by line 78 is partly reflected back from sheet 42 and not shown. The rest of the wave escapes through sheet 42 as shown by line 80.

The waves shown by lines 50, 56, 74 and 80 result in an outgoing wave 82 having one-fourth the wave length of the incoming wave 32, and, of course, four times its frequency. This is the result of using three layers covered with perforated sheets. As previously mentioned, the frequency of the outgoing wave is that of the incoming wave multiplied by one more than the number of layers used. One layer would double the frequency, two layers would triple the frequency, etc.

When the spacing between the perforated sheets (thickness of the cellular layers) is the same and a fraction of half a wave length of the incoming wave, the outgoing wave will constitute a train of smaller waves of equal wave length which is smaller than that of the incoming wave. The outgoing wave has a fundamental at a frequency which is the same as that of the incoming wave, and higher harmonics at frequencies $(n + 1)$ times the fundamental frequency where $n$ is the index number of the particular harmonic. In undergoing the entering and reflection process described above, the harmonic content (amplitudes of the particular harmonics) of the outgoing wave will be different from that of the incoming wave. More precisely, the amplitude of the fundamental of the outgoing wave will be smaller than that of the incoming wave, and so will the amplitudes of outgoing harmonics with index numbers up to the number of layers minus one. Due to the structure of the outgoing wave as a train of waves of equal wave lengths $L/(X+1)$, it can be expected that the $X$ harmonic shows an increase in amplitude over that of the $X$ harmonic of the incoming wave. This means that the outgoing wave radiates more acoustic power at the frequency $f_X=(X+1)f_o$ where $f_o$ is the frequency of the incoming wave and $X$ is the number of layers in the acoustic panel. It should be noted, however, that this is not true for pure sinusoidal waves, since in this case the amplitudes of all higher harmonics vanish identically.

Figure 4:
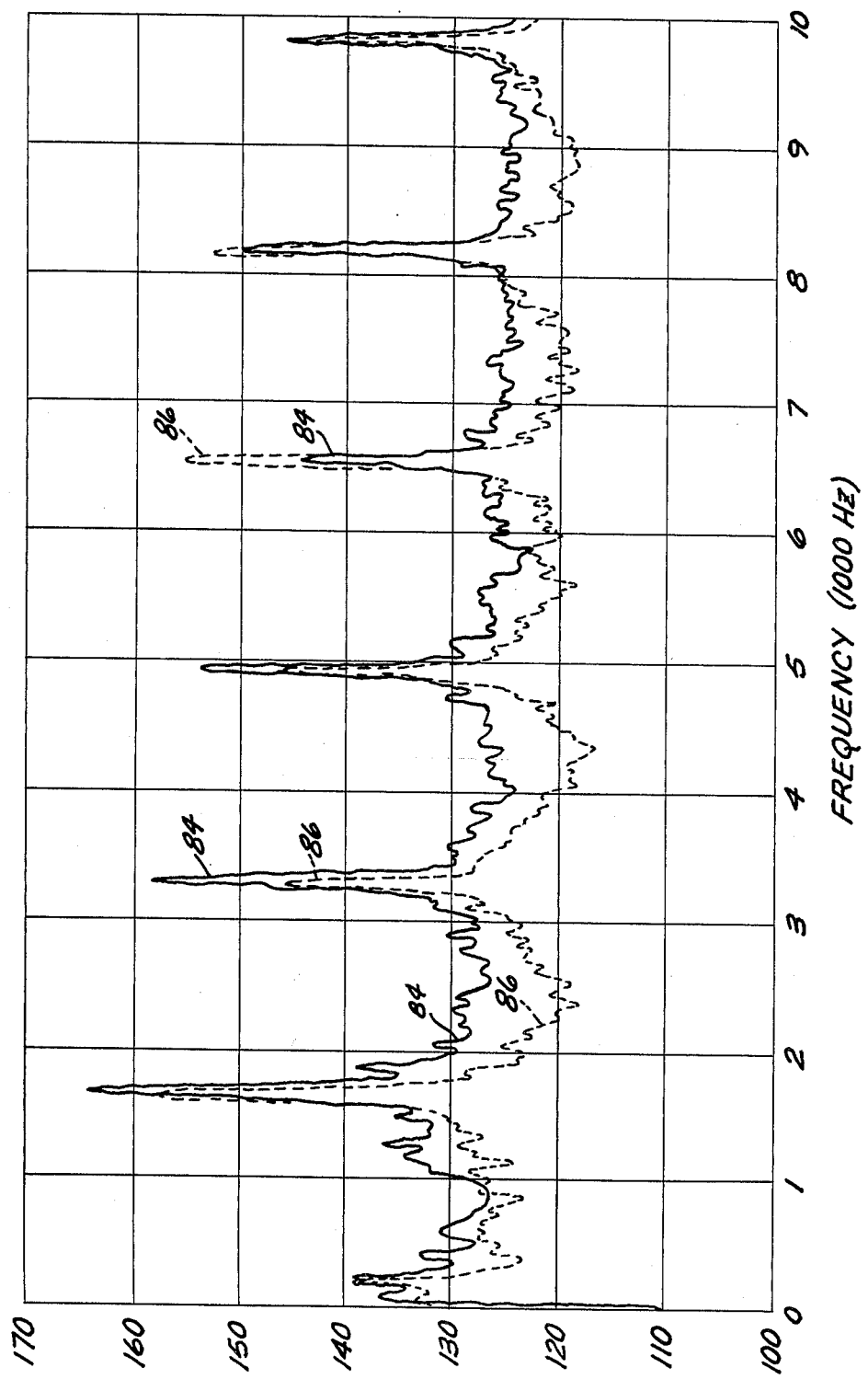
FIG. 4 is a graphic illustration showing the sound pressure spectrum of the output when using the invention and when not using the invention.

Referring now to FIG. 4 there is shown the sound pressure level (SPL) spectrum of high-amplitude discrete sound with the fundamental frequency of 1640 Hz (Hertz) as measured at a certain location. The sound pressure levels of the incoming waves and their reflections from a hard wall are shown in solid line 84, and from a three-layered acoustic liner according to the present invention shown in a dashed line 86. In accordance with the principles of this invention, the acoustic liner should cause a decrease in SPL at frequencies of 1640 Hz, 2 × 1640 Hz, and 3 × 1640 Hz, while the SPL at 4 × 1640 Hz (6560 Hz) should be increased. An inspection of the test results shown in FIG. 4 show this to be true. The solid line 84 shows a higher sound pressure level than the dashed line 86 at frequencies of 1, 2 and 3 × 1640 Hz but at 4 × 1640 Hz the dashed line 86 is noticeably larger.

While an illustrative embodiment has been shown and described with reference to the suppression of noise from aircraft jet engines, it is apparent that other forms of structure embodying the present invention may be used in other noise-generating environments such as in engine exhaust systems, propeller noise areas and other high amplitude noise sources. Any structure or method for breaking up high amplitude sound and shock waves into a train of shorter waves and/or attenuating sound by transferring acoustic power to a higher frequency level and thereby achieving a better atmospheric absorption of the wave energy and/or transferring acoustic power to a frequency level outside the human audio frequency range is believed to be within the scope of the present invention as set forth in the appended claims.

I claim:

1. A multi-layered acoustic liner with perforated sheets between layers of cellular cavity material and a perforated face sheet, each of said sheets having a perforated area of over half its total area for shifting part of the acoustic energy to a higher frequency level to achieve better absorption by the atmosphere, wherein the outgoing wave has a harmonic at some particular frequency $f_x = (x+1) f_o$ whose amplitude is greater than that of the corresponding harmonic of the incoming wave $f_o$ where $x =$ the number of layers in said panel.

2. A multi-layered acoustic liner as set forth in claim 1 wherein said layers have the same thickness, said thickness being of less than half a wave length of the incoming wave.

3. A multi-layered acoustic liner as set forth in claim 1 wherein a sufficient number of layers are in said liner that said harmonic of the outgoing wave is beyond the audible range of the human ear.

* * * * *